US011150007B2

(12) United States Patent
Zhu et al.

(10) Patent No.: US 11,150,007 B2
(45) Date of Patent: Oct. 19, 2021

(54) AIR-REGULATING FRESHNESS-PRESERVING STORAGE DEVICE

(71) Applicant: QINGDAO HAIER JOINT STOCK CO., LTD., Qingdao (CN)

(72) Inventors: Xiaobing Zhu, Qingdao (CN); Bo Jiang, Qingdao (CN); Lei Wang, Qingdao (CN); Hao Zhang, Qingdao (CN); Ming Wang, Qingdao (CN); Bin Fei, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 262 days.

(21) Appl. No.: 16/466,296

(22) PCT Filed: Dec. 1, 2017

(86) PCT No.: PCT/CN2017/114266
§ 371 (c)(1),
(2) Date: Jun. 3, 2019

(87) PCT Pub. No.: WO2018/099476
PCT Pub. Date: Jun. 7, 2018

(65) Prior Publication Data
US 2020/0064052 A1    Feb. 27, 2020

(30) Foreign Application Priority Data

Dec. 2, 2016    (CN) .......................... 201611097466.3

(51) Int. Cl.
*F25D 17/04*    (2006.01)
*B01D 53/22*    (2006.01)
(Continued)

(52) U.S. Cl.
CPC ......... *F25D 17/047* (2013.01); *B01D 53/228* (2013.01); *B01D 69/06* (2013.01);
(Continued)

(58) Field of Classification Search
None
See application file for complete search history.

(56) References Cited

U.S. PATENT DOCUMENTS 10,820,614 B2 *  11/2020  Zhu ..................... F25D 25/025
10,982,895 B2 *   4/2021  Jiang ................... F25D 25/025
(Continued)

FOREIGN PATENT DOCUMENTS

CN    201251336 Y  *  6/2009  ............. F25D 11/00
CN    101949630 A       1/2011
(Continued)

OTHER PUBLICATIONS

English language machine translation for CN 201251336 Y. Retrieved from translationportal.epo.org on Apr. 20, 2021. (Year: 2021).*

*Primary Examiner* — Jason M Greene
(74) *Attorney, Agent, or Firm* — Cheng-Ju Chiang

(57) ABSTRACT

An air-regulating freshness-preserving storage device comprises a container having a first storage space defined therein; and an oxygen removal device configured to remove a part or all of oxygen in air in the first storage space, so as to obtain the air rich in nitrogen, low in oxygen, and favorable for food preservation.

5 Claims, 6 Drawing Sheets

(51) Int. Cl.
*B01D 69/06* (2006.01)
*B01D 69/10* (2006.01)
*F25D 25/02* (2006.01)
*F17C 5/06* (2006.01)

(52) U.S. Cl.
CPC .......... *B01D 69/10* (2013.01); *F25D 25/025* (2013.01); *B01D 2053/222* (2013.01); *B01D 2256/10* (2013.01); *B01D 2257/104* (2013.01); *B01D 2259/4525* (2013.01); *F17C 5/06* (2013.01); *F17C 2221/011* (2013.01); *F25D 2317/041* (2013.01)

(56) References Cited

U.S. PATENT DOCUMENTS

| | | | |
|---|---|---|---|
| 2004/0031705 A1* | 2/2004 | DeTemple, II | F25D 25/025 206/213.1 |
| 2015/0021260 A1* | 1/2015 | Iwai | B01D 69/10 210/346 |
| 2016/0366919 A1* | 12/2016 | van Someren Greve | B01D 53/22 |
| 2017/0112171 A1* | 4/2017 | Cermak | B01D 53/22 |

FOREIGN PATENT DOCUMENTS

| | | |
|---|---|---|
| CN | 204757524 U | 11/2015 |
| CN | 106628640 A | 5/2017 |
| CN | 106839586 A | 6/2017 |
| CN | 206599123 U | 10/2017 |
| CN | 107436067 A | 12/2017 |
| CN | 206695495 U | 12/2017 |
| JP | 2004-293827 A | 10/2004 |

\* cited by examiner

AIR-REGULATING FRESHNESS-PRESERVING STORAGE DEVICE

CROSS-REFERENCE TO RELATED APPLICATION

The present application is a 35 U.S.C. § 371 National Phase conversion of International (PCT) Patent Application No. PCT/CN2017/114266, filed on Dec. 1, 2017, which claims priority of Chinese Patent Application No. 201611097466.3, filed on Dec. 2, 2016 and titled "Air-Regulating Freshness-Preserving Storage Device", which is incorporated herein by reference in its entirety. The PCT International Patent Application was filed and published in Chinese.

TECHNICAL FIELD

The present invention relates to the field of article freshness-keeping technologies, and more particularly, to an air-regulating freshness-preserving storage device.

BACKGROUND

The refrigerator is a refrigerating device that maintains a constant low temperature, and is also a civilian product that keeps food or other articles at a constant-low-temperature cold state. With the improvement of the life quality, consumers demand more and more on freshness keeping of stored food, especially, the color, taste and the like of the food. Therefore, it should be ensured that the color, taste, freshness and the like of the stored food are unchanged as much as possible during storage. At present, there is only vacuum freshness keeping on the market for better storing the food. The vacuum freshness keeping manners often used are freshness keeping with a vacuum bag and freshness keeping with a vacuum storage space.

If the vacuum bag is adopted for freshness keeping, the consumers need to carry out the vacuumizing action every time the food is stored, which is troublesome in operation and cannot be enjoyed by the consumers.

If the vacuum storage space is adopted for freshness keeping, since a refrigerator body and the like are of rigid structures, in order to maintain the vacuum state, the requirements on a vacuumizing system and the sealing performance of the refrigerator are very high. When an article is taken or placed every time, a large quantity of new air is poured in, and thus the consumption of energy is relatively high. Moreover, in a vacuum environment, it is relatively difficult for the food to receive cold, which is particularly unfavorable for food storage. In addition, due to the vacuum environment, it takes a lot of effort for the user to open a refrigerator door every time, thereby causing inconvenience to the user. Although the vacuum storage spaces of some refrigerators can be ventilated by vacuumizing systems, the user needs to wait for a longer time, resulting in poor timeliness. Besides, a relatively longer vacuum time will also cause serious deformation of a refrigerator body and the like. That is, the existing refrigerators with vacuumizing structures cannot complete the vacuum freshness keeping, its requirements on the strength of the refrigerator body and the like are very large, and thus, the implementing requirements and cost are higher.

SUMMARY

The present invention aims to overcome at least one of the deficiencies of the existing freshness-keeping storage devices by providing an air-regulating freshness-preserving device, which creatively extracts oxygen in the air in a space from the space, so as to obtain a nitrogen-rich oxygen-poor atmosphere favorable for freshness keeping of food in the space. In the atmosphere, the oxygen content in a space where fruits and vegetables are preserved is reduced to reduce the intensity of aerobic respiration of the fruits and vegetables. Meanwhile, a basic respiration action is ensured, thereby preventing anaerobic respiration of the fruits and vegetables, and further achieving the purpose of long-term freshness keeping of the fruits and vegetables.

For this purpose, the present invention provides an air-regulating freshness-preserving storage device, comprising: a container, wherein a first storage space is defined in the container; and an oxygen removing device, configured to extract a part or all of the oxygen in the air in the first storage space from the first storage space to obtain a nitrogen-rich and oxygen-poor atmosphere favorable for food freshness keeping in the first storage space.

Optionally, the oxygen removing device comprises: an air-regulating membrane assembly, having at least one air-regulating membrane and an oxygen-rich gas collecting chamber, wherein the surrounding space of the air-regulating membrane assembly communicates with the first storage space, and the air-regulating membrane assembly is configured such that more oxygen in the airflow in the surrounding space of the air-regulating membrane assembly permeates through the air-regulating membrane to enter the oxygen-rich gas collecting chamber relative to the nitrogen in the airflow in the surrounding space of the air-regulating membrane assembly; and a gas extracting device, wherein the inlet end of the gas extracting device communicates with the oxygen-rich gas collecting chamber via a pipeline to extract the gas permeating into the oxygen-rich gas collecting chamber to the outside of the container.

Optionally, the container is provided with a plurality of gas pressure balancing holes, and the first storage space communicates with the outside space of the container via the plurality of gas pressure balancing holes.

Optionally, the air-regulating membrane assembly is a flat-plate-type oxygen-enriching membrane component, and each of the air-regulating membranes is an oxygen-enriching membrane.

Optionally, the flat-plate-type oxygen-enriching membrane component further comprises a support frame having a first surface and a second surface parallel to each other, the support frame is provided with a plurality of airflow channels extending on the first surface and the second surface respectively and penetrating the support frame to communicate the first surface and the second surface, and the plurality of airflow channels forms the oxygen-rich gas collecting chamber together; and at least one of the oxygen-enriching membranes is two planar oxygen-enriching membranes which are paved on the first surface and the second surface of the support frame respectively.

Optionally, the air-regulating freshness-preserving storage device further comprises: a drawer, slidably mounted in the first storage space to be outwardly withdrawn from and inwardly inserted into the first storage space operatively from a forward opening of the first storage space.

Optionally, the air-regulating freshness-preserving storage device further comprises: a refrigerating system, configured to provide cold to the first storage space.

Optionally, the air-regulating freshness-preserving storage device further comprises: a box body, wherein a second storage space is defined in the box body; and the container is mounted in the second storage space.

Optionally, an accommodating chamber communicating with the first storage space is disposed in a top wall of the container; and the air-regulating membrane assembly is disposed in the accommodating chamber.

Optionally, at least one first vent hole and at least one second vent hole spaced apart from the at least one first vent hole are formed in a wall surface between the accommodating chamber of the top wall and the first storage space, so as to communicate the accommodating chamber with the first storage space at different positions.

The air-regulating freshness-preserving storage device further comprises a fan disposed in the accommodating chamber to promote the gas in the first storage space to be returned to the first storage space via the at least one first vent hole, the accommodating chamber, and the at least second vent hole in sequence.

The air-regulating freshness-preserving storage device according to the present invention has the oxygen removing device capable of extracting the oxygen from the first storage space, so that the nitrogen-rich oxygen-poor atmosphere favorable for food freshness keeping can be formed in the first storage space. In the atmosphere, the oxygen content in the space where fruits and vegetables are preserved is reduced to reduce the intensity of the aerobic respiration of the fruits and vegetables. Meanwhile, a basic respiration function is ensured, thereby preventing anaerobic respiration of the fruits and vegetables, and further achieving the purpose of long-term freshness keeping of the fruits and vegetables. The air-regulating freshness-preserving storage device not only has a good freshness-keeping effect, but also has low requirements of rigidity and strength on the container and the like; and the implementing requirements and the cost are low.

Further, the inventors have found that since the conventional nitrogen-generating device for air-regulating freshness keeping is larger in size and higher in cost, the technology is basically limited to various large-scale professional storehouses (the storage capacity is generally at least 30 tons). It can be said that what type of appropriate air-regulating technology and corresponding device may be adopted to economically miniaturize and silence the air-regulating system to make it suitable for families or individual users is the technical problem that the technicians in the field of air-regulating freshness keeping have been eager to solve but has not successfully solved. In the air-regulating freshness-preserving storage device according to the present invention, the oxygen removing device comprises the air-regulating membrane assembly and the gas extracting device, so that the above technical problem that the technicians in the field of air-regulating freshness keeping have been eager to solve but has not successfully solved is solved. The air-regulating freshness-preserving storage device is not only small in size but also low in noise, and is especially suitable for families and individuals.

In particular, the air-regulating freshness-preserving storage device according to the present invention may be a refrigerator having a refrigerating function or a fixed storage device or a portable storage device without the refrigerating function.

Other features and advantages of the present invention will become apparent from the following detailed description of exemplary embodiments of the present invention with reference to the accompanying drawings.

BRIEF DESCRIPTION OF THE DRAWINGS

Some specific embodiments of the present invention are described in detail below with reference to the accompanying drawings by way of illustration instead of limitation. The same reference signs in the drawings denote the same or similar components or parts. Those skilled in the art should understand that the drawings are not necessarily drawn to scale. In the drawings.

DETAILED DESCRIPTION

Figure 1:
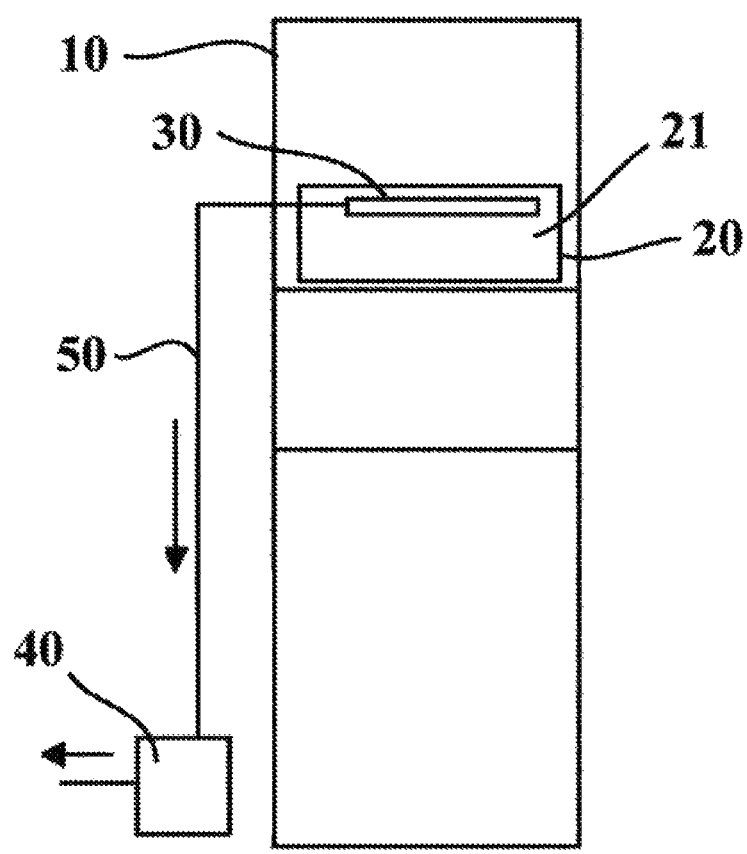
FIG. 1 is a schematic structural view of an air-regulating freshness-preserving storage device according to an embodiment of the present invention.

FIG. 1 is a schematic structural view of an air-regulating freshness-preserving storage device according to an embodiment of the present invention. As shown in FIG. 1, the embodiment of the present invention provides an air-regulating freshness-preserving storage device, which may comprise a container 20 and an oxygen removing device.

A first storage space 21 is defined in the container 20. In order to preserve food, and to enable the first storage space 21 to be airtight as much as possible, the first storage space 21 is an airtight space or an approximately airtight space. In some optional embodiments, the air-regulating freshness-preserving storage device further comprises a door body which opens or closes the first storage space 21 and which is rotatably mounted in the container 20. In some preferred embodiments, the air-regulating freshness-preserving storage device further comprises a drawer 28 slidably mounted in the first storage space 21 to be outwardly withdrawn from and inwardly inserted into the first storage space 21 operatively from a forward opening of the first storage space 21. The drawer 28 may have a drawer end cover which can cooperate with the opening of the first storage space 21 for closing and opening the first storage space 21.

The oxygen removing device is configured to extract part or all of the oxygen in the air in the first storage space 21 from the first storage space 21 to obtain a nitrogen rich and oxygen-poor atmosphere favorable for food freshness keeping in the first storage space 21. That is, the oxygen removing device extracts part or all of the oxygen from the first storage space by using the principle of extracting the gas to the outside from the inside of the first storage space 21, so that the nitrogen-rich and oxygen-poor atmosphere favorable for food freshness keeping is formed in the first storage space 21. The oxygen removing device may also be a withdrawable oxygen removing device.

It is known to those skilled in the art that normal air components comprise (by volume percent, the same hereinafter): about 78% nitrogen, about 21% oxygen, about 0.939% rare gases (helium, neon, argon, krypton, xenon and radon), 0.031% of carbon dioxide, and 0.03% of other gases and impurities (for example, ozone, nitrogen monoxide, nitrogen dioxide, water vapor, etc.). The nitrogen-rich and oxygen-poor atmosphere favorable for food freshness keeping in the present application refers to the atmosphere in which the nitrogen content exceeds the nitrogen content in the normal air and the oxygen content is lower than the oxygen content in the normal air. In the atmosphere, the oxygen content in the space where the fruits and vegetables are preserved is reduced to reduce the intensity of the aerobic respiration of the fruits and vegetables. Meanwhile, a basic respiration function is ensured, thereby preventing anaerobic respiration of the fruits and vegetables, and further achieving the purpose of long-term freshness keeping of the fruits and vegetables.

In some embodiments of the present invention, the oxygen removing device may comprise an air-regulating membrane assembly 30 and a gas extracting device 40. The air regulating membrane assembly 30 has at least one air-regulating membrane 31 and an oxygen rich gas collecting chamber. The surrounding space of the air-regulating membrane assembly 30 communicates with the first storage space 21, and the air-regulating membrane assembly 30 is configured such that more oxygen in the airflow in the surrounding space of the air regulating membrane assembly 30 permeates through the air-regulating membrane 31 to enter the oxygen-rich gas collecting chamber relative to the nitrogen therein. Specifically, the inside surface of each air-regulating membrane 31 faces the oxygen-rich gas collecting chamber, so that when the pressure of the oxygen-rich gas collecting chamber is lower than the pressure of the surrounding space of the air-regulating membrane assembly 30, more oxygen in the air in the outer space of the air-regulating membrane assembly 30 permeates through at least one air regulating membrane 31 to enter the oxygen-rich gas collecting chamber relative to the nitrogen therein.

The inlet end of the gas extracting device 40 communicates with the oxygen-rich gas collecting chamber via a pipeline 50 to extract the gas permeating into the oxygen-rich gas collecting chamber to the outside of the container 20.

In the present embodiment, the gas extracting device 40 extracts the gas outwardly, so that the pressure of the oxygen-rich gas collecting chamber is lower than the pressure of the surrounding space of the air-regulating membrane assembly 30, and further, the oxygen in the surrounding space of the air-regulating membrane assembly 30 can enter the oxygen-rich gas collecting chamber. Since the first storage space communicates with the surrounding space of the air-regulating membrane assembly 30, the air in the first storage space will enter the surrounding space of the air-regulating membrane assembly 30. Therefore, the oxygen in the air in the first storage space can also enter the oxygen-rich gas collecting chamber, thereby obtaining the nitrogen-rich and oxygen-lean atmosphere favorable for food freshness keeping in the first storage space.

Figure 4:
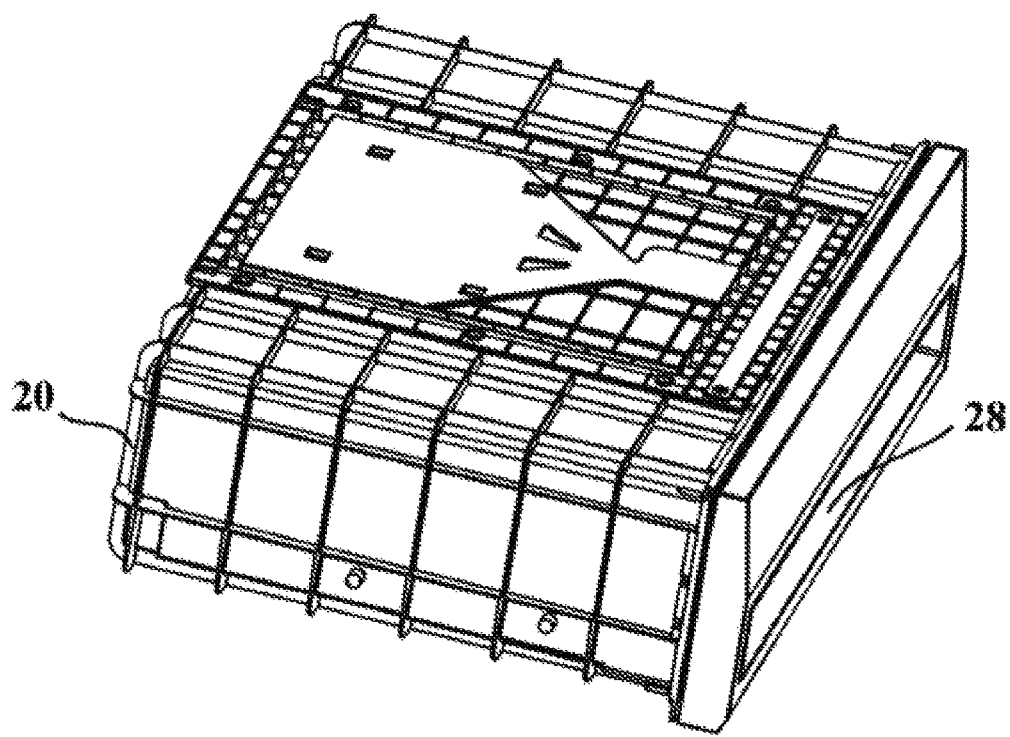
FIG. 4 is a schematic partial structural view of an air-regulating freshness-preserving storage device according to an embodiment of the present invention.
Figure 5:
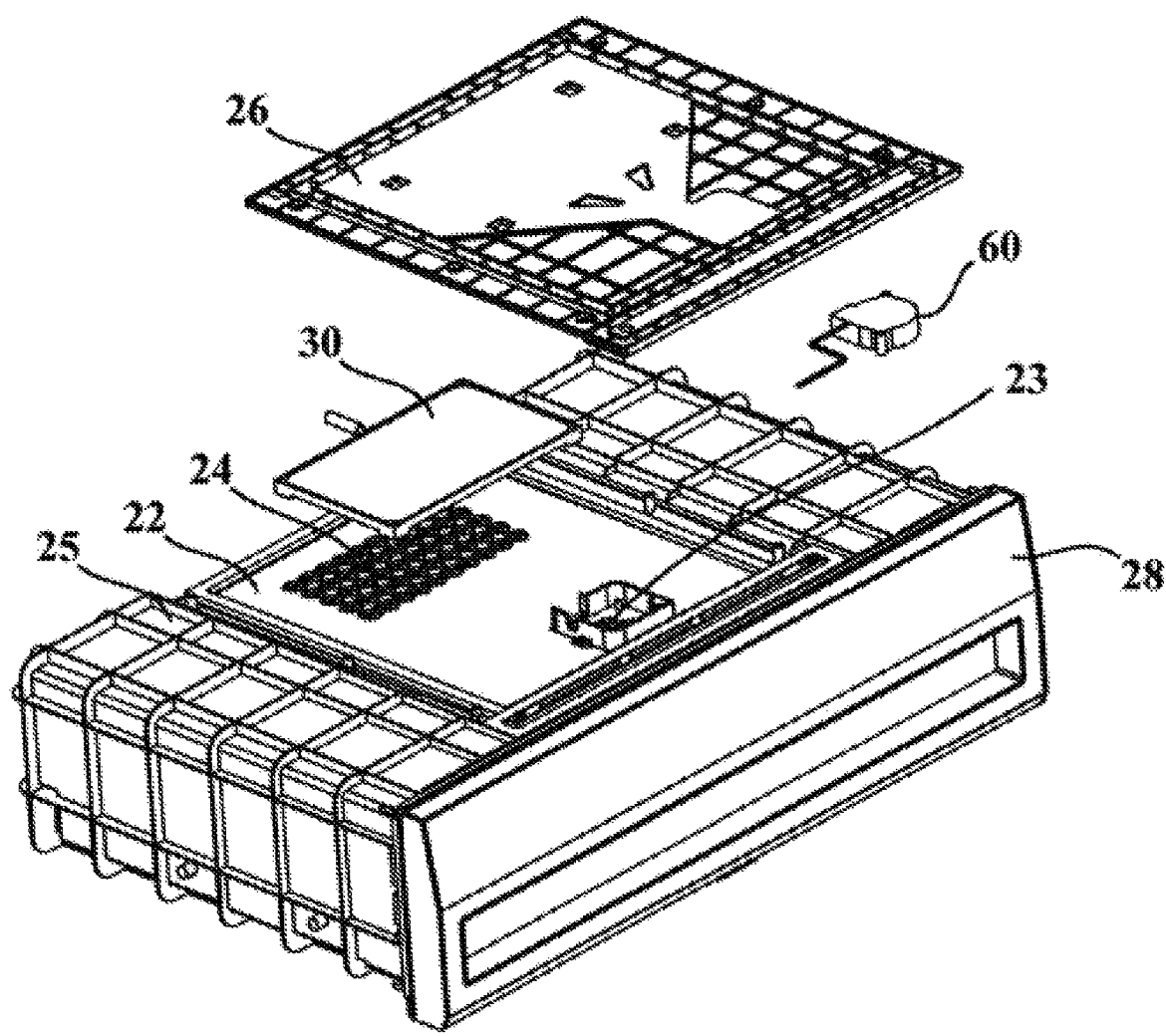
FIG. 5 is a schematic exploded view of the structure shown in FIG. 4.

In some embodiments of the present invention, as shown in FIG. 4 and FIG. 5, the air regulating membrane assembly 30 may be disposed on the container 20. Further, the air regulating membrane assembly 30 is in the form of a flat plate, and preferably disposed on the top wall of the container 20 horizontally. Specifically, an accommodating chamber 22 communicating with the first storage space 21 is disposed in the top wall of the container 20. The air-regulating membrane assembly 30 is disposed in the accommodating chamber 22. At least one first vent hole 23 and a second vent hole 24 are formed in a wall surface between the accommodating chamber of the top wall and the first storage space. The at least one first vent hole 23 is spaced apart from the at least one second vent hole 24, so as to communicate the accommodating chamber and the first storage space at different positions. In some optional embodiments, the inner side of the top wall of the container 20 has a recessed groove. The air-regulating membrane assembly 30 is disposed in the recessed groove of the top wall of the container 20.

In some embodiments of the present invention, in order to promote the flow of the gas in the first storage space 21 and the accommodating chamber 22, the air-regulating freshness-preserving storage device further comprises a fan 60, which may be disposed in the accommodating chamber 22. The fan is configured to promote the gas in the first storage space 21 to enter the accommodating chamber 22 via the first vent hole 23, and cause the gas in the accommodating chamber 22 to enter the first storage space 21 via the second vent hole 24. That is, the fan 60 can promote the gas in the first storage space to be returned to the first storage space 21 via the at least one first vent hole 23, the accommodating chamber 22, and the at least one second vent hole 24 in sequence.

The fan 60 is preferably a centrifugal fan. The centrifugal fan is located above the at least one first vent hole 23, and has an axis of rotation vertically downward and an air inlet opening directly facing the first vent hole 23. An air outlet of the centrifugal fan may face the air-regulating membrane assembly 30. The air-regulating membrane assembly 30 is disposed above the at least one second vent hole 24, such that each air-regulating membrane of the air-regulating membrane assembly 30 is parallel to the top wall of the container 20. The centrifugal fan 60 is disposed at the front of the accommodating chamber 22, and the air-regulating membrane assembly 30 is disposed at the rear of the accommodating chamber 22. Further, the top wall of the container 20 comprises a main plate portion 25 and a cover plate portion 26. A recessed portion is formed in a partial region of the main plate portion 25. The cover plate portion 26 is detachably disposed on the recessed portion in a covering manner, so as to form the above accommodating chamber 22. In order to facilitate the manufacture of the container 20, the main plate portion 25 may be integrally formed with the side wall, the bottom wall, and the rear wall of the container 20.

Figure 6:
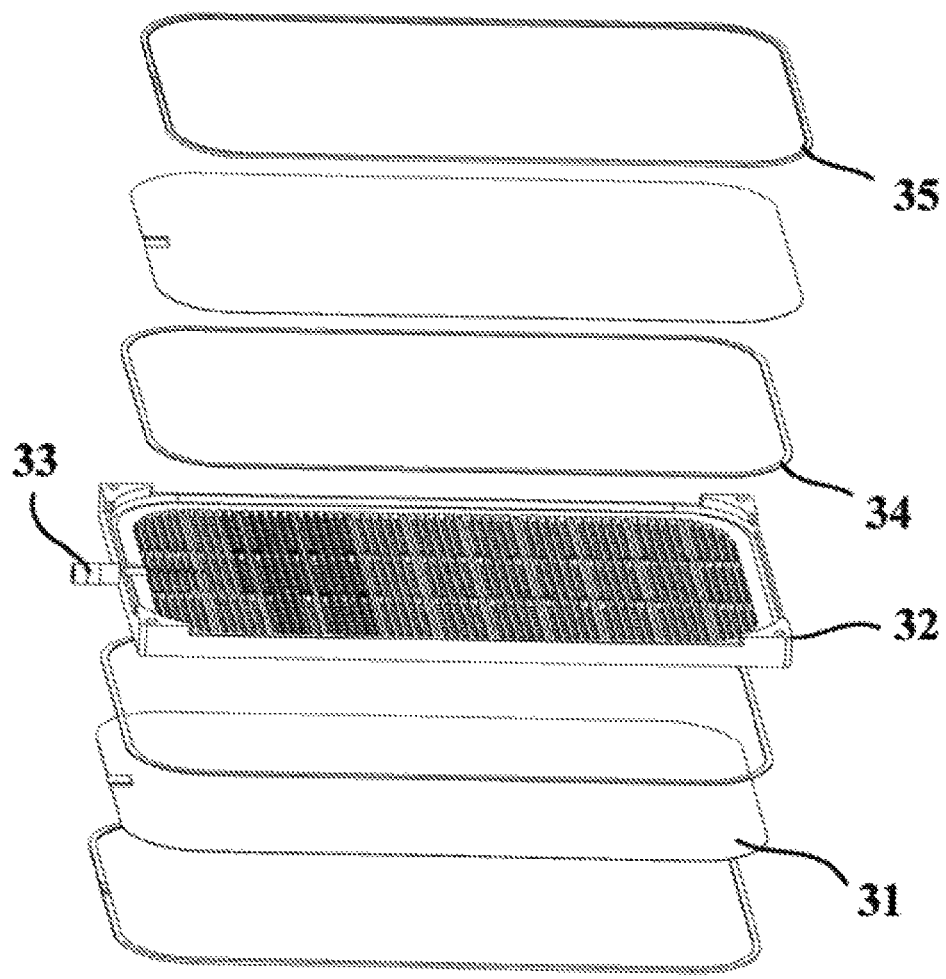
FIG. 6 is a schematic exploded view of an air-regulating membrane assembly in an air-regulating freshness-preserving storage device according to an embodiment of the present invention.

In some embodiments of the present invention, the air-regulating membrane assembly 30 may also comprise a support frame 32 as shown in FIG. 6. Two air-regulating membranes 31 may be disposed and mounted on both sides of the support frame 32 respectively, so that the two air-regulating membranes 31 and the support frame 32 form the oxygen-rich gas collecting chamber in a surrounding manner.

Further, the air-regulating membrane assembly 30 is a flat-plate-type oxygen-enriching membrane component, and each air-regulating membrane 31 is an oxygen-enriching membrane. The support frame 32 may comprise a frame, and structures such as rib plates and/or flat plates disposed in the frame. Airflow channels may be formed between the rib plates and between the rib plates and the flat plates; and the surfaces of the rib plates and the surfaces of the flat plates may be provided with grooves to form the airflow channels. The rib plates and/or the flat plates may increase the structural strength and the like of the air-regulating membrane assembly 30. That is, the flat-plate-type oxygen-enriching membrane component further comprises a support frame having a first surface and a second surface parallel to each other. The support frame is provided with a plurality of airflow channels extending on the first surface and the second surface respectively, and penetrating the support frame to communicate the first surface with the second surface. The plurality of airflow channels forms the oxygen-rich gas collecting chamber together. The at least one oxygen-enriching membrane is two planar oxygen-enriching membranes which are paved on the first surface and the second surface of the support frame respectively.

In some embodiments of the present invention, the support frame 32 comprises an air extracting hole 33 communicating with the above at least one airflow channel and disposed in the frame, so that the oxygen in the oxygen-rich gas collecting chamber is allowed to be output. The air extracting hole 33 communicates with the air extracting device 40. Specifically, the air extracting hole 33 may be disposed in the long side or the short side of the frame, which is determined according to the set orientation of the air-regulating membrane assembly 30 or actual design requirements. For example, in the embodiment shown in FIG. 4 and FIG. 5, the air extracting hole 33 may be disposed in the long side of the frame. The air-regulating membrane 31 is mounted onto the frame by a double-sided adhesive tape 34 at first, and then sealed by a sealant 35.

In some embodiments, the at least one airflow channel formed inside the support frame 32 may be one or more cavities communicating with the air extracting hole 33. In some embodiments, the at least one airflow channel formed inside the support frame 32 may be of a grid structure. Specifically, the support frame 32 may comprise a side frame, a plurality of first rib plates, and a plurality of second rib plates. The plurality of first rib plates is longitudinally disposed inside the frame at an interval and extends transversely. One side surfaces of the plurality of first rib plates form the first surface. The plurality of second rib plates is transversely disposed at an interval on the other side surface of the above plurality of first rib plates and extends longitudinally. One side surfaces of the plurality of second rib plates away from the first rib plates form the second surface. In the support frame 32 according to the present invention, the plurality of first rib plates longitudinally disposed at an interval and transversely extending and the plurality of second rib plates transversely disposed at an interval on one side surface of the plurality of first rib plates and longitudinally extending are disposed inside the frame, so that the continuity of the airflow channels is ensured on one hand, the size of the support frame 32 is greatly reduced on the other hand, and the strength of the support frame 32 is greatly enhanced. In addition, the above structure of the support frame 32 ensures that the air-regulating membrane 31 can obtain sufficient support, and can maintain better flatness all the time even when the negative pressure inside the oxygen-rich gas collecting chamber is relatively higher. Thus, the long service life of the air-regulating membrane assembly 30 is ensured.

In a further embodiment, the plurality of first rib plates may comprise a plurality of first narrow rib plates and a plurality of first wide rib plates. The plurality of first wide rib plates is disposed at an interval, and the plurality of first narrow rib plates is disposed between every two adjacent first wide rib plates. The plurality of second rib plates may comprise a plurality of second narrow rib plates and a plurality of second wide rib plates. The plurality of second wide rib plates is disposed at an interval, and the plurality of the second narrow rib plates is disposed between every two adjacent second wide rib plates. Those skilled in the art will readily understand that "wide" and "narrow" herein are relative.

In some embodiments, each of the first wide rib plates is recessed inwardly from a side surface thereof on which the first surface is formed to form a first trench. Each of the second wide rib plates is recessed inwardly from a side surface thereof on which the second surface is formed to form a second trench, thereby improving the communication of the internal grid structure under the premise of ensuring that the thickness of the support frame 32 is very small (or the size is very small).

In a further embodiment, a partial surface of each of the first wide rib plates deviated away from the first surface extends toward the second rib plate to be flush with the second surface. The first wide rib plate is recessed inwardly from the partial surface which is flush with the second surface to form a third trench. The intersecting parts the third trench and the second trench are communicated to form a cross trench. A partial surface of the at least one of the plurality of second wide rib plates deviated away from the second surface extends toward the first rib plate to be flush with the first surface. At least one of the plurality of second wide rib plates is inwardly recessed from the partial surface which is flush with the first surface to form a fourth trench. The intersecting parts of the fourth trench and the first trench are communicated to form a cross trench.

In some embodiments of the present invention, in order to facilitate the flow of the airflow, the inner surface of the cover plate portion 26 may extend downwardly to form a plurality of air guiding rib plates, so as to guide the airflow from the fan 60 to flow through the outside surface of each air-regulating membrane 31 of the air-regulating membrane assembly 30 deviated away from the oxygen-rich gas collecting chamber in the accommodating chamber. The plurality of air guiding rib plates may be divided into two groups, comprising a first group of air guiding rib plates and a second group of air guiding rib plates which are symmetrically disposed with the first group of air guiding rib plates about a plane. Each group of air guiding rib plates comprises a first air guiding rib plate, at least one second air guiding rib plate, and at least one third air guiding rib plate. The first air guiding rib extends from the air outlet of the centrifugal fan to one side of the accommodating chamber to a transverse outer side of the air-regulating membrane assembly 30. Each second air guiding rib plate is disposed between the two first air guiding rib plates and between the air-regulating membrane assembly 30 and the centrifugal fan. Each third air guiding rib plate is located on a transverse outer side of the air-regulating membrane assembly 30. Thus, airflow is guided to enter the gap between the air-regulating membrane assembly 30 and the bottom or top surface of the accommodating chamber from two transverse sides of the air-regulating membrane assembly 30.

In some embodiments of the present invention, a plurality of air pressure balancing holes may be formed in the container 20; and the first storage space 21 communicates with the outside space of the first storage space 21 via the plurality of air pressure balancing holes. Each of the air pressure balancing holes may be a millimeter-level air pressure balancing hole. For example, each of the air pressure balancing holes has a diameter of 0.1 mm to 3 mm, preferably 1 mm, 1.5 mm, or the like. With the plurality of air pressure balancing holes, the pressure in the first storage space 21 is not too low. Due to the plurality of air pressure balancing holes, the nitrogen in the first storage space 21 will not flow outwardly; even if the nitrogen flows, the flow is very small or even negligible, which will not adversely affect the freshness keeping of food in the first storage space 21. In some optional embodiments of the present invention, the air pressure balancing hole may not be disposed in the container 20. Even so, a large amount of gases such as nitrogen still exists in the first storage space 21. The user can open the drawer 28 without too much effort; and a lot of effort will be saved compared to the existing vacuum storage room.

In some embodiments of the present invention, the air-regulating freshness-preserving storage device further comprises a box body 10 and a main door body. A second storage space 11 may be defined in the box body 10. The container 20 is mounted in the second storage space 11. The main door body is pivoted on the box body 10 to open or close the second storage space 11. That is, the air-regulating freshness-preserving storage device has a relatively larger space; but nitrogen-rich and oxygen-deficient freshness keeping is performed only in a small space in the relatively larger space.

Figure 2:
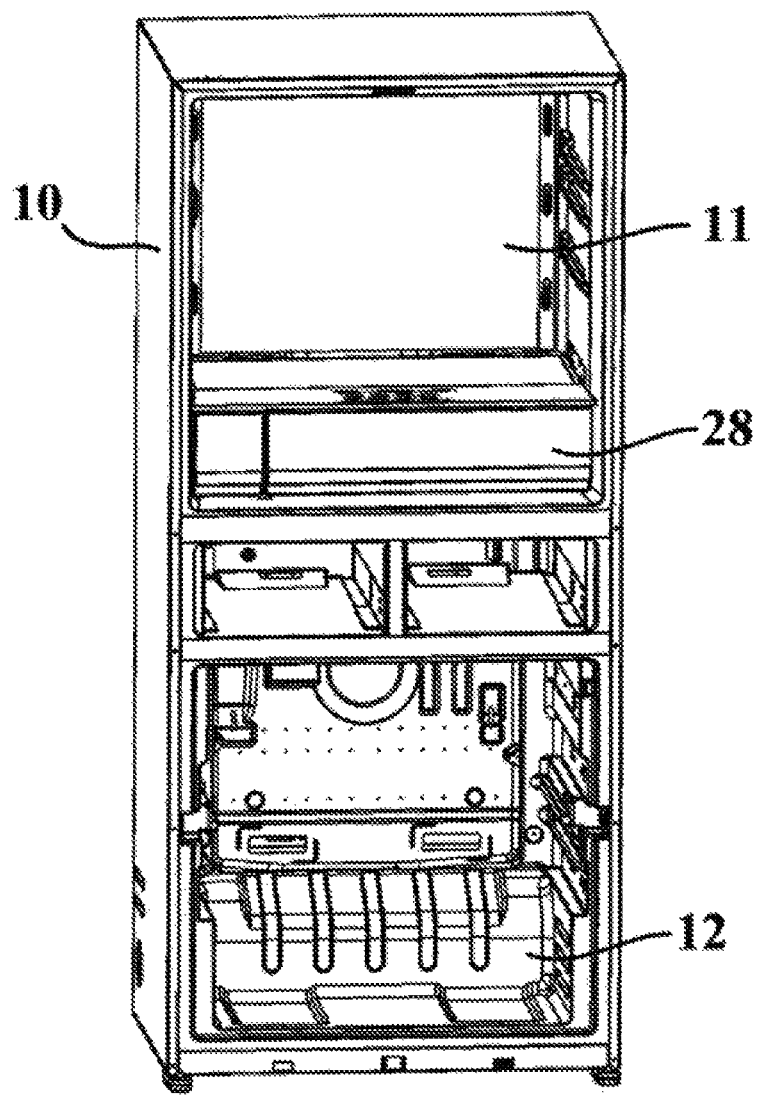
FIG. 2 is a schematic partial structural view of an air-regulating freshness-preserving storage device according to another embodiment of the present invention.
Figure 3:
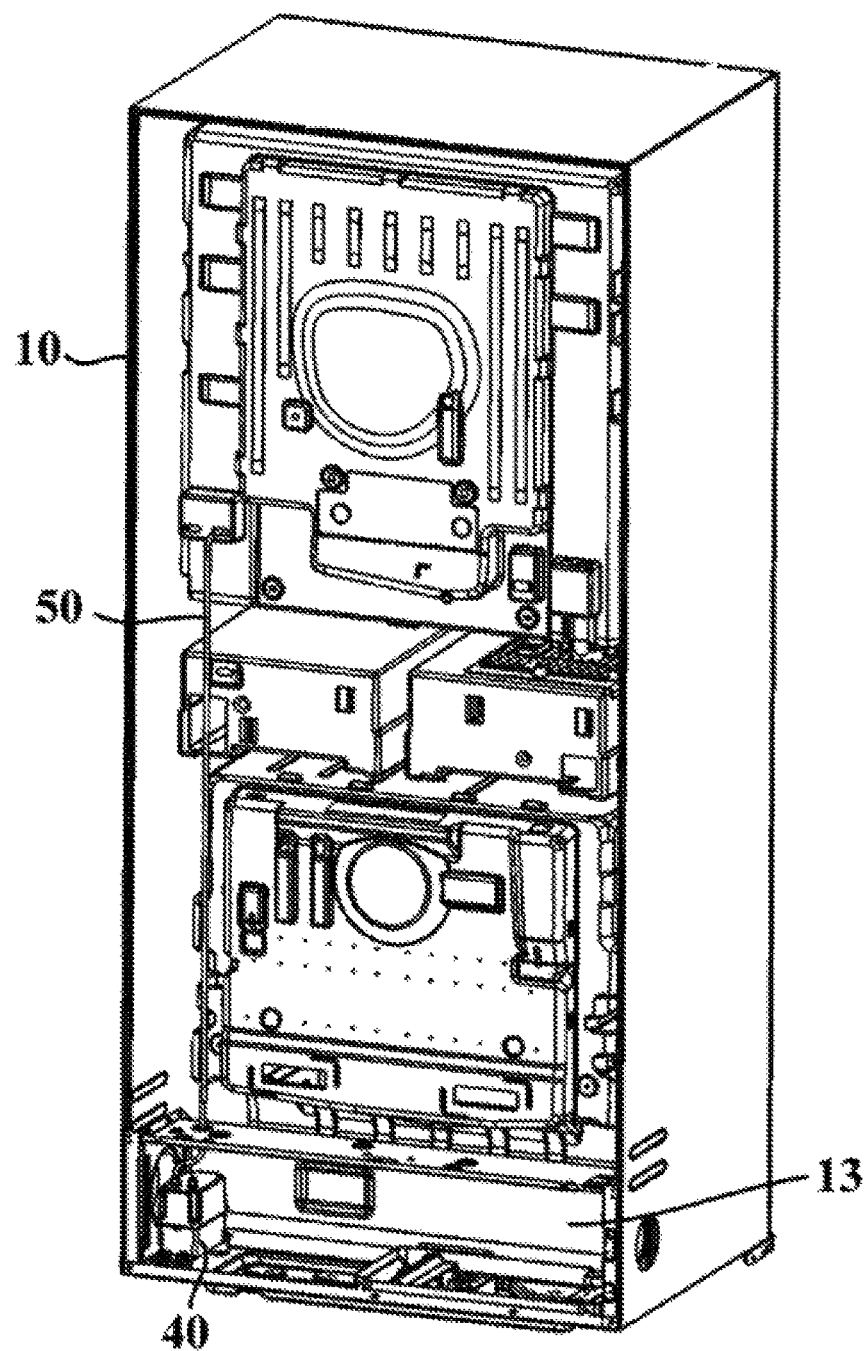
FIG. 3 is a schematic structural view of the structure shown in FIG. 2 from another perspective.

In some embodiments of the present invention, as shown in FIG. 2 and FIG. 3, the air-regulating freshness-preserving storage device further comprises a refrigerating system configured to provide cold to the first storage space 21. Further, the refrigerating system firstly supplies the cold to the second storage space 11, and then the cold is transferred to the first storage space 21. Such an air-regulating freshness preserving storage device having the refrigerating system is also generally referred to as a refrigerating and freezing device, and may be, for example, a refrigerator at least having a refrigerating compartment 11 and a freezing compartment 12. The refrigerating system may be a common compression refrigerating system, a semiconductor refrigerating system or the like, which provides the cold to a storage compartment by, for example, direct cooling and/or air cooling, so that the storage compartment has a desired storage temperature. In some embodiments, the storage temperature of the refrigerator refrigerating compartment may be 2° C. to 9° C., or may be 4° C. to 7° C. The storage temperature of the freezing compartment may range from −22° C. to −14° C., or −20° C. to 16° C. Since such refrigerating systems are well known and readily implemented by those skilled in the art, in order not to cover and obscure the inventive aspects of the present application, the refrigerating system will not be described in further detail below. The second storage space according to the embodiment of the present invention may preferably be the refrigerating compartment, and may, of course, be the freezing compartment or a temperature-changing compartment. Further, the relative positions of the refrigerating space, the freezing space, and the temperature changing space can be adjusted according to actual needs.

In some embodiments of the present invention, as shown in FIG. 2 and FIG. 3, the lower part of the rear side of the box body 10 may have a mounting chamber 13. When the refrigerating system is the compression refrigerating system, the mounting chamber 13, also referred to as a compressor housing, may extend in a transverse direction of the container. The air extracting device 40 may comprise an air pump disposed in the mounting chamber 13. Specifically, the air extracting device 40 may be mounted at a transverse end of the mounting chamber 13.

In order to facilitate the mounting of the air pump and reduce the noise, and the like, the air extracting device 40 may further comprise a mounting base plate and a sealing box. The mounting base plate may be mounted on the bottom surface of the mounting chamber 13 by a plurality of damping foot pads. The sealing box is mounted on the mounting base plate. The gas extracting device 40 is mounted in the sealing box. Further, a mounting frame is disposed in the sealing box, and the mounting frame and the inner wall of the sealing box are connected by a plurality of damping cushion blocks. The air pump is fixed in the mounting frame, so as to reduce the vibration and noise during operation of the air pump. Specifically, the bottom of the mounting frame is provided with two damping cushion blocks, and the damping cushion blocks sleeve positioning posts on the bottom surface of the sealing box. One circular damping cushion block is disposed on each of the two opposite sides of the mounting frame, and is clamped in a clamping groove of the corresponding side wall of the sealing box. One damping cushion block is fixed on each of the other two opposite sides of the mounting frame. The air pump may be located among the various damping cushion blocks in the sealing box and fastened to the mounting frame by screws.

In some embodiments of the present invention, a locking device, a handle and a handle positioning device are disposed between the drawer 28 and the container 20. The locking device comprises pivoting lock catches disposed on both sides of an end cover of the drawer, two buckling portions disposed on the container 20, and a fastening promoting device. Each buckling portion may be a protrusion. The fastening promoting device may be configured to promote the two pivoting lock catches to rotate in the directions (i.e., their respective first directions) to be engaged with their respective buckling portions. The handle extends horizontally and may be slidably mounted to the end cover of the drawer in a vertical direction. Moreover, when the drawer 28 is in the closed state, the position of the handle may be the initial position of the handle. The handle is configured such that both ends thereof are in contact with and abut against the two pivoting lock catches respectively when in the initial position, to prevent each pivoting lock catch from rotating in the other direction opposite to the corresponding first direction. Thus, the pivoting lock catches are engaged with the buckling portions to lock the drawer 28 in the container 20. Further, each pivoting lock catch is allowed to rotate in the direction opposite to the corresponding first direction when the handle is moved vertically to a locking releasing position, i.e., moved from the initial position to the locking releasing position. The pivoting lock catches are allowed to rotate to be disengaged from the corresponding buckling portions when the drawer 28 is pulled outwardly, thereby opening the drawer 28. The handle positioning device is configured to hold the handle in the predetermined position after the handle is moved to each predetermined position, primarily including the initial position and the locking releasing position. When the drawer is required to be opened, the user firstly moves the handle vertically to enable the handle to reach the locking releasing position, the handle positioning device holds the handle in such position, and then the user pulls the drawer 28 outwardly. When the drawer is required to be closed, the user firstly closes the drawer 28 and then returns the handle the initial position by moving it vertically, and the handle positioning device holds the handle in such position, thereby holding the drawer 28 and the container 20 in a locked state.

In order to further smooth the movement of the handle, the two ends of the handle are respectively provided with a guiding rod and a sliding block; and the guiding rod extends in the vertical direction. The drawer 28 further comprises two groups of slideways; and each group of the slideways at least has three chutes extending in the vertical direction, so that two chutes are located at the both sides of the guide bar respectively, and the sliding block moves on the remaining chute; or two chutes are located at the both sides of the sliding block respectively, and the guiding rod moves on the remaining chute. For example, each group of the slideways may comprise four chutes, wherein two chutes are located at the front and rear sides of the guiding rode respectively; and two chutes are located at the transverse two sides (i.e., the left and right sides) of the sliding block respectively.

In this regard, it will be appreciated by those skilled in the art that although many exemplary embodiments have been shown and described in detail here, many other variations or modifications consistent with the principles of the present invention can still be directly determined or derived based on the content disclosed by the present invention without departing from the spirit and scope of the present invention. Therefore, the scope of the present invention should be understood and construed as covering all these variations or modifications.

What is claimed is:

1. An air-regulating freshness-preserving storage device, comprising:
    a container, wherein a first storage space is defined in the container; and
    an oxygen removing device, configured to extract a part or all of the oxygen in the air in the first storage space from the first storage space to obtain a nitrogen-rich oxygen-poor atmosphere favorable for food freshness keeping in the first storage space, wherein the oxygen removing device comprises:
        an air-regulating membrane assembly, having at least one air-regulating membrane and an oxygen-rich gas collecting chamber, wherein a surrounding space of the air regulating membrane assembly communicates with the first storage space, and the air-regulating membrane assembly is configured such that more oxygen in the airflow in the surrounding space of the air-regulating membrane assembly permeates through the air-regulating membrane to enter the oxygen-rich gas collecting chamber relative to the nitrogen in the airflow in the surrounding space of the air-regulating membrane assembly; and
        a gas extracting device, wherein an inlet end of the gas extracting device communicates with the oxygen-rich gas collecting chamber via a pipeline to extract gas permeating into the oxygen-rich gas collecting chamber to an outside of the container;
    wherein the air-regulating membrane assembly is a flat-plate-type oxygen-enriching membrane component, and each of the air-regulating membranes is an oxygen-enriching membrane;
    the flat-plate-type oxygen-enriching membrane component further comprises a support frame having a first surface and a second surface parallel to each other, the support frame is provided with a plurality of airflow channels extending on the first surface and the second surface respectively and penetrating the support frame to communicate the first surface and the second surface, and the plurality of airflow channels forms the oxygen-rich gas collecting chamber together; and
    at least one of the oxygen-enriching membranes is two planar oxygen-enriching membranes which are paved on the first surface and the second surface of the support frame respectively;
    an accommodating chamber communicated with the first storage space is recessed in a top wall of the container, and the air-regulating membrane assembly is received in the accommodating chamber;
    at least one first vent hole and a second vent hole are formed in a wall between the accommodating chamber and the first storage space, and the at least one first vent hole is spaced apart from the second vent hole, the at least one first vent hole and the second vent hole are communicated with the accommodating chamber and the first storage space at different positions;
    the air-regulating freshness-preserving storage device further comprises a fan disposed in the accommodating chamber, and the fan is configured to promote gas in the first storage space to be returned to the first storage space via the at least one first vent hole, the accommodating chamber, and the second vent hole in sequence;
    the fan is a centrifugal fan and located above the at least one first vent hole, and the fan has an axis of rotation vertically downward and an air inlet opening directly facing the at least one first vent hole, an air outlet of the fan faces the air-regulating membrane assembly, the air regulating membrane assembly is disposed above the second vent hole, and each air-regulating membrane of the air-regulating membrane assembly is parallel to the top wall of the container;
    the fan is disposed at a front of the accommodating chamber, and the air-regulating membrane assembly is disposed at a rear of the accommodating chamber.

2. The air-regulating freshness-preserving storage device according to claim 1, wherein the container is provided with a plurality of gas pressure balancing holes, and the first storage space communicates with an outside space of the container via the plurality of gas pressure balancing holes.

3. The air-regulating freshness-preserving storage device according to claim 1, further comprising a drawer, wherein the drawer is slidably mounted in the first storage space to be outwardly withdrawn from and inwardly inserted into the first storage space operatively from a forward opening of the first storage space.

4. The air-regulating freshness-preserving storage device according to claim 1, further comprising a refrigerating system configured to provide cold to the first storage space.

5. The air-regulating freshness-preserving storage device according to claim 1, further comprising a box body, wherein a second storage space is defined in the box body; and
    the container is mounted in the second storage space.

* * * * *